United States Patent
Naito et al.

(10) Patent No.: US 10,236,677 B2
(45) Date of Patent: Mar. 19, 2019

(54) SEMICONDUCTOR DEVICE

(71) Applicant: FUJI ELECTRIC CO., LTD., Kawasaki-shi (JP)

(72) Inventors: Tatsuya Naito, Matsumoto (JP); Masahito Otsuki, Matsumoto (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 511 days.

(21) Appl. No.: 14/875,663

(22) Filed: Oct. 5, 2015

(65) Prior Publication Data
US 2016/0126718 A1    May 5, 2016

(30) Foreign Application Priority Data
Oct. 31, 2014    (JP) ................... 2014-222433

(51) Int. Cl.
| H02H 3/00 | (2006.01) |
| H02H 7/00 | (2006.01) |
| H02H 9/02 | (2006.01) |
| H02H 3/087 | (2006.01) |
| H02H 3/02 | (2006.01) |
| H02H 3/093 | (2006.01) |

(52) U.S. Cl.
CPC ............ *H02H 3/087* (2013.01); *H02H 3/025* (2013.01); *H02H 3/093* (2013.01)

(58) Field of Classification Search
CPC .......... H02H 3/10; H02H 3/025; H02H 3/087; H02H 3/093; H02M 7/537; H02M 7/003
USPC ........................................................ 361/101
See application file for complete search history.

(56) References Cited

U.S. PATENT DOCUMENTS

| 9,106,156 | B2 * | 8/2015 | Tanaka ................ H02M 7/003 |
| 2006/0114633 | A1 * | 6/2006 | Watanabe ............ H02H 3/087 |
| | | | 361/93.1 |
| 2008/0212247 | A1 * | 9/2008 | Lee ................ H03K 17/08128 |
| | | | 361/88 |
| 2014/0184303 | A1 | 7/2014 | Hasegawa et al. |
| 2015/0016005 | A1 * | 1/2015 | Simonson ............ H02H 9/025 |
| | | | 361/93.9 |

FOREIGN PATENT DOCUMENTS

| JP | S5999958 A | 6/1984 |
| JP | H04-354156 A | 12/1992 |
| JP | 2002-095151 A | 3/2002 |
| JP | 2012-253202 A | 12/2012 |
| JP | 2014-130909 A | 7/2014 |

\* cited by examiner

*Primary Examiner* — Thienvu V Tran
*Assistant Examiner* — Lucy M Thomas
(74) *Attorney, Agent, or Firm* — Rabin & Berdo, P.C.

(57) ABSTRACT

In a semiconductor device, an IGBT and an SJMOSFET connected in parallel have respective gate terminals controlled independently of each other. When a high voltage occurs and a high current flows caused by short-circuit in an external circuit under a condition of ON state of the IGBT and SJMOSFET, an operational amplifier in the control IC detects the overcurrent through the IGBT and controls the gate signal to restrict the current through the IGBT. After that, the operational amplifier throttles the current through the IGBT according to a reference voltage of a capacitor decreasing by the discharge through a constant current source, thus conducting soft-OFF operation of the IGBT.

14 Claims, 7 Drawing Sheets

SEMICONDUCTOR DEVICE

CROSS-REFERENCE TO RELATED APPLICATION

This application is based on, and claims priority to, Japanese Patent Application No. 2014-222433, filed on Oct. 31, 2014, contents of which are incorporated herein by reference.

BACKGROUND OF THE INVENTION

1. Field of the Invention

The present invention relates to a semiconductor device and in particular to a semiconductor device that is provided with an insulated gate bipolar transistor (IGBT), a metal oxide semiconductor field effect transistor (MOSFET), and a control integrated circuit (IC).

2. Description of the Related Art

Inverter circuits in power supply devices and motor control devices generally use power semiconductor elements of IGBTs or MOSFETs. IGBTs exhibit small ON resistance in a range of high withstand voltage and high current while MOSFETs exhibit small ON resistance in a range of medium and low withstand voltage and low current. Patent Document 1 and Patent Document 2 disclose semiconductor devices exhibiting a characteristic of small ON resistance in the whole range of from low withstand voltage to high withstand voltage and from low current to high current by utilizing those characteristics of IGBTs and MOSFETs.

A semiconductor device composes an intelligent power module (IPM) comprising a power semiconductor element and a control IC that includes a driving circuit for driving the power semiconductor element and a protection circuit, all components being incorporated in a single package.

FIG. 7 is a circuit diagram showing an example of a conventional semiconductor device provided with an IGBT and a MOSFET.

This semiconductor device is composed of a power semiconductor element 100 and a control IC 101. The power semiconductor element 100 comprises an IGBT 102 and a MOSFET 103 connected in parallel. The emitter of the IGBT 102 and the source of the MOSFET 103 are connected to a terminal E and a terminal S0 of the power semiconductor element 100. The collector of the IGBT 102 and the drain of the MOSFET 103 are connected to a terminal C of the power semiconductor element 100. The gate of the IGBT 102 is connected through a resistor 104, to a terminal G0 of the power semiconductor element 100. The gate of the MOSFET 103 is connected directly to the terminal G0 of the power semiconductor element 100. The diode 105 that is anti-parallel-connected to the MOSFET 103 is a body diode formed at the MOSFET 103 and functions as a free-wheeling diode for circulating the current flowing from the terminal E of the power semiconductor element 100. The terminal S0 and the terminal G0 are connected to a terminal U0 and a terminal T0 of the control IC 101, respectively.

The power semiconductor element 100 having the IGBT 102 and the MOSFET 103 connected in parallel exhibits a low ON resistance in a low current range thanks to a characteristic of the MOSFET 103, which reduces steady-state loss. While in a high current range, the characteristic of the IGBT 102 works to avoid breakdown of the power semiconductor element.

A resistor 104 having a high resistance value is connected to the gate of the IGBT 102 to allow the MOSFET 103 to turn ON first and then the IGBT 102 to turn ON when the power semiconductor element 100 turns ON. This decreases a feedback capacitance and reduces a turn ON loss.

The control IC 101 is provided with an overcurrent protection circuit though not indicated in FIG. 7. The overcurrent protection circuit monitors the current flowing through the emitter of the IGBT 102 at the terminal U0. When the current through the emitter exceeds a predetermined threshold value, the potential at the terminal T0 is forced to drop, turning OFF the IGBT 102 and the MOSFET 103.

A half-bridge inverter circuit can be constructed by making up a totem-pole circuit with a semiconductor device having the structure described above and another semiconductor device having the same structure and by connecting the power semiconductor elements of the two semiconductor devices in series. Such an inverter circuit can convert a DC voltage to an AC voltage by ON-OFF-controlling the power semiconductor elements in the high side arm and the power semiconductor elements in the low side arm.

[Patent Document 1]

Japanese Unexamined Patent Application Publication No. H04-354156 (FIG. 2 and FIG. 5, in particular)

[Patent Document 2]

Japanese Unexamined Patent Application Publication No. 2014-130909 (FIG. 5, in particular)

If a short-circuit accident occurs in the semiconductor device in the high side arm during an ON controlled period of the power semiconductor element in the semiconductor device used in the low side arm, the control IC detects overcurrent of the power semiconductor element and turns the power semiconductor element OFF. The abrupt drop of the collector current of the power semiconductor element results in a fast rise in the collector voltage, which may reach the withstand voltages of the IGBT and the MOSFET. The IGBT and the MOSFET are turned OFF nearly at the same time upon detecting the overcurrent. Thus, the power semiconductor element carries a heavy current under the condition of high voltage application. Consequently, a short-circuit guarantee time, which is a time period until a semiconductor element is broken down, is determined by the property of the IGBT which exhibits a shorter short-circuit guarantee time. Thus, the semiconductor device exhibits a low short-circuit tolerance.

SUMMARY OF THE INVENTION

The present invention has been made in view of the problem in conventional technologies, and an object of the present invention is to provide a semiconductor device that protects a power semiconductor element from an abnormal high voltage in the process of turning OFF upon overcurrent detection.

To solve the above problem, the present invention provides a semiconductor device that comprises an IGBT and a MOSFET formed in a single chip and connected in parallel, and has gate terminals for the IGBT and for the MOSFET constructed independent of each other. The semiconductor device comprises: an IGBT; a MOSFET exhibiting a withstand voltage lower than that of the IGBT and having a drain and a source connected to a collector and an emitter respectively, of the IGBT; and a control IC delivering a first control signal to a first gate of the IGBT and a second control signal to a second gate of the MOSFET, and comprising an overcurrent detecting circuit for detecting overcurrent in the IGBT and a forcing OFF circuit for making the first control signal forcedly be an OFF signal. The forcing OFF circuit of the control IC makes the first control signal forcedly be an OFF signal when the overcurrent detecting circuit detects overcurrent during a time period in which the IGBT and the MOSFET are in an ON state caused by the first control signal and the second control signal.

A semiconductor device as stated above controls the IGBT and the MOSFET connected in parallel independently of each other. When overcurrent of the IGBT is detected, the IGBT is first turned OFF. Thus, the invention allows compatibility between a high channel density and an improved short-circuit tolerance

DETAILED DESCRIPTION OF THE INVENTION

The following describes in detail, some preferred embodiments of the present invention with reference to accompanying drawings. The following description is made using an example of MOSFET of a super-junction MOSFET (SJ-MOSFET) which generates conduction loss and switching loss that are less than those of a traditional MOSFET. However, the MOSFET can be a normal one and not a super-junction type. The various types of embodiments described below can be applied in combination as far as no contradiction arises.

First Embodiment

Figure 1:
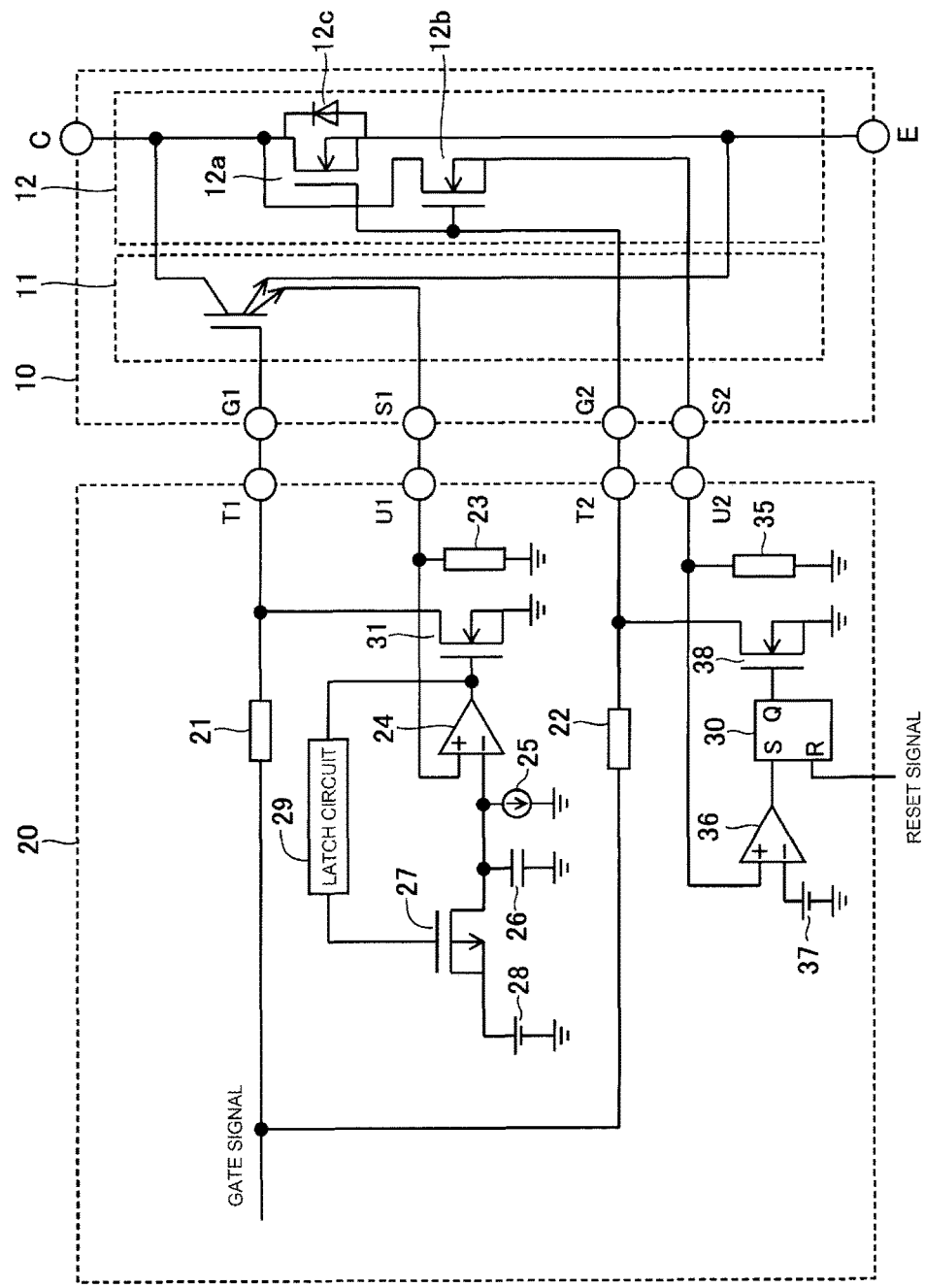
FIG. 1 is a circuit diagram of a semiconductor device according to a first embodiment of the present invention.
Figure 2:
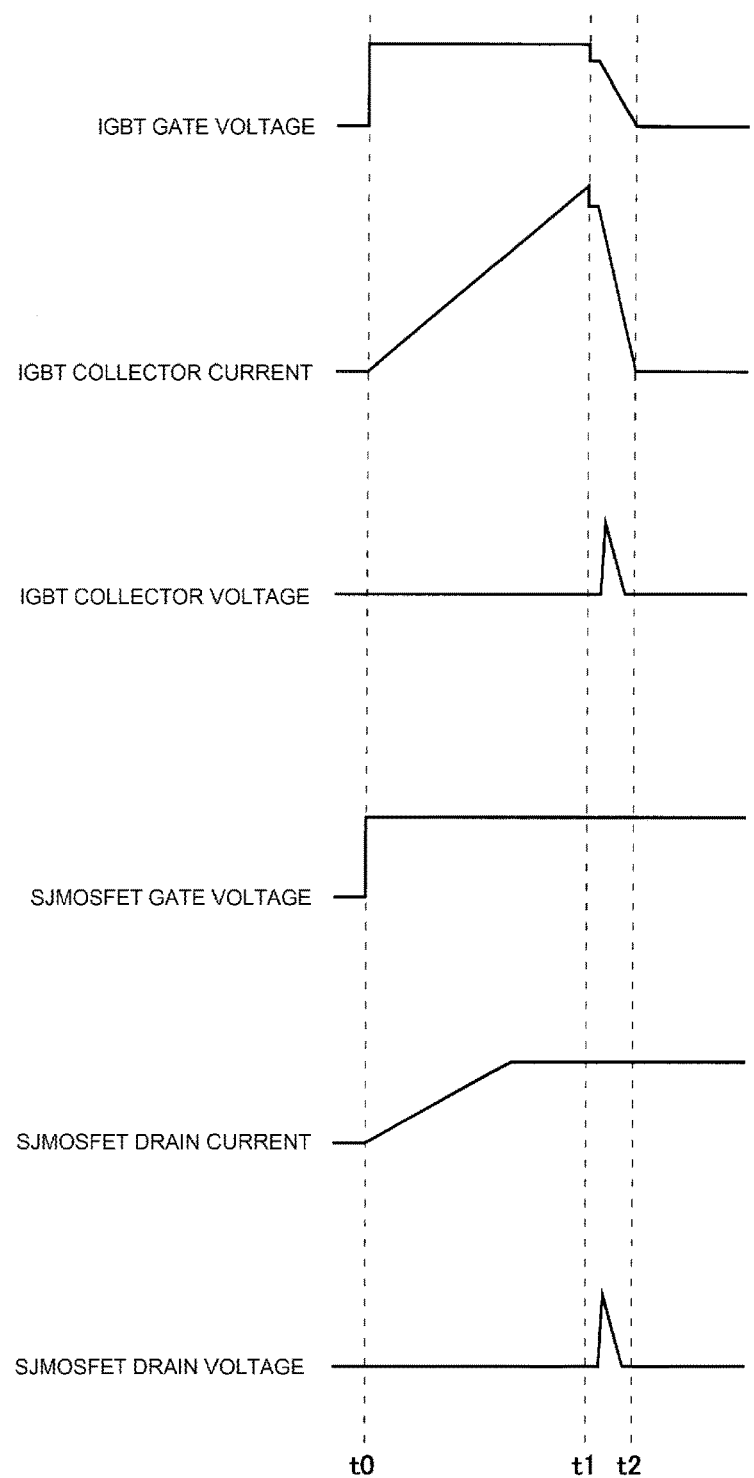
FIG. 2 is a timing chart showing waveforms of essential parts of the semiconductor device according to the first embodiment of the present invention.

FIG. 1 is a circuit diagram of a semiconductor device according to a first embodiment of the present invention; and FIG. 2 is a timing chart showing waveforms of essential parts of the semiconductor device according to the first embodiment of the present invention.

The semiconductor device according to the first embodiment of the invention comprises a power semiconductor element 10 and a control IC 20. The power semiconductor element 10 is formed with an IGBT 11 and a SJMOSFET 12 connected in parallel on a single chip. The IGBT 11 is composed of a main element that carries a main current and a current sensing element that detects the current flowing through the main element. The main element and the current sensing element are shown in FIG. 1 by a common IGBT symbol, but two emitter terminals, an emitter terminal of the main element and an emitter terminal of the current sensing element, are depicted separately. The SJMOSFET 12 is composed of a main element 12a that carries a main current and a current sensing element 12b that detects the current flowing through the main element 12a, both elements being connected in parallel.

The emitter of the IGBT 11 and the source of the SJMOSFET 12 are both connected to the terminal E of the power semiconductor element 10. The collector of the IGBT 11 and the drain of the SJMOSFET 12 are both connected to the terminal C of the power semiconductor element 10. The emitter terminal of the current sensing element of the IGBT 11 is connected to the terminal S1 of the power semiconductor element 10 and the source of the current sensing element 12b of the SJMOSFET 12 is connected to the terminal S2 of the power semiconductor element 10.

The gate terminals of the IGBT 11 and the SJMOSFET 12 are disposed independently—the gate of the IGBT 11 is connected to the terminal G1 of the power semiconductor element 10, and the gate of the SJMOSFET 12 is connected to the terminal G2 of the power semiconductor element 10. The SJMOSFET 12 contains a body diode 12 that functions as a free-wheeling diode to circulate a current from the terminal E of the power semiconductor element 10 upon turning OFF of the IGBT 11 and SJMOSFET 12.

The control IC 20 has terminals T1, T2, and terminals U1, U2, which are connected to terminals G1, G2, and S1, S2 of the power semiconductor element 10, respectively. The control IC 20 delivers gate signals for turning ON and turning OFF the power semiconductor element 10, including a first control signal to the terminal T1 through a resistor 21, and a second control signal to the terminal T2 through a resistor 22.

The control IC 20 has a resistor 23 one terminal of which is connected to the terminal U1 and the other terminal of the resistor 23 is connected to the ground. The one terminal of the resistor 23 is also connected to a non-inverting terminal of an operational amplifier 24. An inverting terminal of the operational amplifier 24 is connected to one terminal of a constant current source 25 and one terminal of a capacitor 26, and to the drain of a transistor 27. The other terminal of the constant current source 25 and the other terminal of the capacitor 26 are connected to the ground. The source of the transistor 27 is connected to the positive terminal of a voltage source 28, and the negative terminal of the voltage source 28 is connected to the ground. The output terminal of the operational amplifier 24 is connected to the input terminal of a latch circuit 29, the output terminal of which is connected to the gate of the transistor 27. The output terminal of the operational amplifier 24 is also connected to the gate of a transistor 31. The drain of the transistor 31 is connected to the terminal T1, and the source of the transistor 31 is connected to the ground.

The resistor 23 and the operational amplifier 24 construct an overcurrent detecting circuit for monitoring the current flowing through the IGBT 11 and detecting overcurrent thereof. A ramp voltage generating circuit is constructed by the transistor 27, the voltage source 28, the constant current source 25, and the capacitor 26, which are controlled by the latch circuit 29. The operational amplifier 24 and the transistor 31 construct a soft OFF control circuit that changes the magnitude of the first control signal delivered to the terminal T1 toward a turning OFF direction according to the ramp voltage.

The control IC 20 further comprises a resistor 35, one terminal of which is connected to the terminal U2, and the other terminal of the resistor 35 is connected to the ground. The one terminal of the resistor 35 is also connected to a non-inverting input terminal of a comparator 36. An inverting input terminal of the comparator 36 is connected to the positive terminal of a reference voltage source 37, and the negative terminal of the reference voltage source 37 is connected to the ground. The output terminal of the comparator 36 is connected to the set input terminal S of an RS flip-flop 30, and the output terminal Q of the RS flip-flop 30 is connected to the gate of a transistor 38. The drain of the transistor 38 is connected to the terminal T2, and the source of the transistor 38 is connected to the ground.

An overcurrent detecting circuit is constructed by the resistor 35, the comparator 36, and the reference voltage source 37 and monitors the current flowing through the SJMOSFET 12 and detects overcurrent thereof. The transistor 38 connected to the comparator 36 through the RS flip-flop 30 constructs a forced OFF circuit that forcedly changes the second control signal delivered to the terminal T2 into an OFF signal.

In a normal operation of the semiconductor device having the construction as described above, the gate signals, the first control signal and the second control signal, generated by the control IC 20 are delivered to the terminals T1 and T2, respectively. In the power semiconductor element 10, the first control signal given to the terminal G1 turns ON or turns OFF the IGBT 11, and the second control signal given to the terminal G2 turns ON or turns OFF the SJMOSFET 12. During the ON state of the power semiconductor element 10, the current flowing through the IGBT 11 and the SJMOSFET 12 is within the rated current value, and overcurrent is not detected for the IGBT 11 and SJMOSFET 12.

At this time, the terminal voltage across the resistor 23 (referred to as a sensing voltage) generated by the current through the current sensing element of the IGBT 11 is lower than the charged voltage of the capacitor 26 (referred to as a reference voltage). Consequently, the operational amplifier 24 delivers a voltage signal at a low level. This makes the transistor 31 in an OFF state, which does not affect the first control signal given to the terminal T1. The latch circuit 29, receiving a voltage signal at a low level from the operational amplifier 24, delivers a voltage signal at a low level, which makes the transistor 27 in an ON state. Thus, the capacitor 26 is charged with the current supplied by the voltage source 28. Because the current supplied to the capacitor 26 from the voltage source 28 is larger than the current discharged by the constant current source 25, the voltage across the capacitor 26 is maintained at a high voltage level.

Similarly, in the comparator 36 for detecting overcurrent of the SJMOSFET 12, the sensed voltage detected with the resistor 35 is smaller than the reference voltage by the reference voltage source 37. Consequently, the comparator 36 delivers a voltage signal at a low level. The flip-flop 30 remains in a reset state and delivers a voltage signal at a low level from the output terminal Q. As a result, the transistor 38 is in an OFF state and does not affect the second control signal given to the terminal T2.

Now, description will be made about an operation of the semiconductor device when a short-circuit accident has occurred in another power semiconductor element at the high side arm connected in series to the terminal C of the power semiconductor element 10. As shown in FIG. 2, at the time to, a first control signal of a gate voltage for the power semiconductor element 10 is given to the terminal G1 of the power semiconductor element 10, and a second control signal of a gate voltage for the SJMOSFET 12 is given to the terminal G2 of the power semiconductor element 10. As a result, the collector current of the IGBT 11 increases and the drain current of the SJMOSFET 12 increases.

When the collector current of the IGBT 11 increases and the sensed voltage across the resistor 23 exceeds the reference voltage across the capacitor 26 at the time t1, the output of the operational amplifier 24 becomes a voltage signal at a high level to turn ON the transistor 31. Because a current flows in the transistor 31 through the resistor 21, the gate voltage of the IGBT 11 is pulled down to throttle the collector current of the IGBT 11. After that, the collector current of the IGBT 11 is kept balanced so as to equalize the sensed voltage with the reference voltage.

A high level of the output voltage from the output terminal of the operational amplifier 24 operates the latch circuit 29 and retains the detected state. The latch circuit 29 delivers a voltage signal at a high level to turn OFF the transistor 27. As a result, the reference voltage across the capacitor 26 decreases with discharge at a constant current from the constant current source 25. Thus, the reference voltage becomes a ramping voltage that gradually decreases from a high level. Corresponding to the decrease in the reference voltage, the sensed voltage similarly decreases and the collector current of the IGBT 11 also decreases gradually. At the time t2, the gate voltage of the IGBT 11 and the collector current of the IGBT 11 decrease down to zero.

Thus, soft OFF control is performed in which the control IC 20, upon detecting overcurrent in the IGBT 11, forcedly decreases the gate voltage of the IGBT 11 gradually to throttle the collector current of the IGBT 11. The soft OFF control substantially reduces the increase in the collector voltage of the IGBT 11 due to turning OFF of the IGBT 11 and also reduces the increase in the drain voltage of the SJMOSFET 12. Therefore, the SJMOSFET 12 is prevented from breakdown due to application of a high voltage.

The overcurrent detecting circuit of the SJMOSFET 12 operates independently of the overcurrent detecting circuit for the IGBT 11. In the overcurrent detecting circuit for the SJMOSFET 12, the source current of the current sensing element 12b of the SJMOSFET 12 flows through the resistor 35 and when the sensed voltage exceeds the voltage of the reference voltage source 37, the comparator 36 delivers a voltage signal at a high level. As a result the RS flip-flop 30 is set to deliver a voltage signal at a high level from the output terminal Q. As a result, the transistor 38 is turned ON and the second control signal given to the terminal T2 is pulled down to turn OFF the SJMOSFET 12. The overcurrent detecting circuit of the SJMOSFET 12 returns to a standing-by state for another overcurrent detection after removing the cause of the overcurrent by giving a reset signal to the reset input terminal R of the RS flip-flop 30.

Second Embodiment

Figure 3:
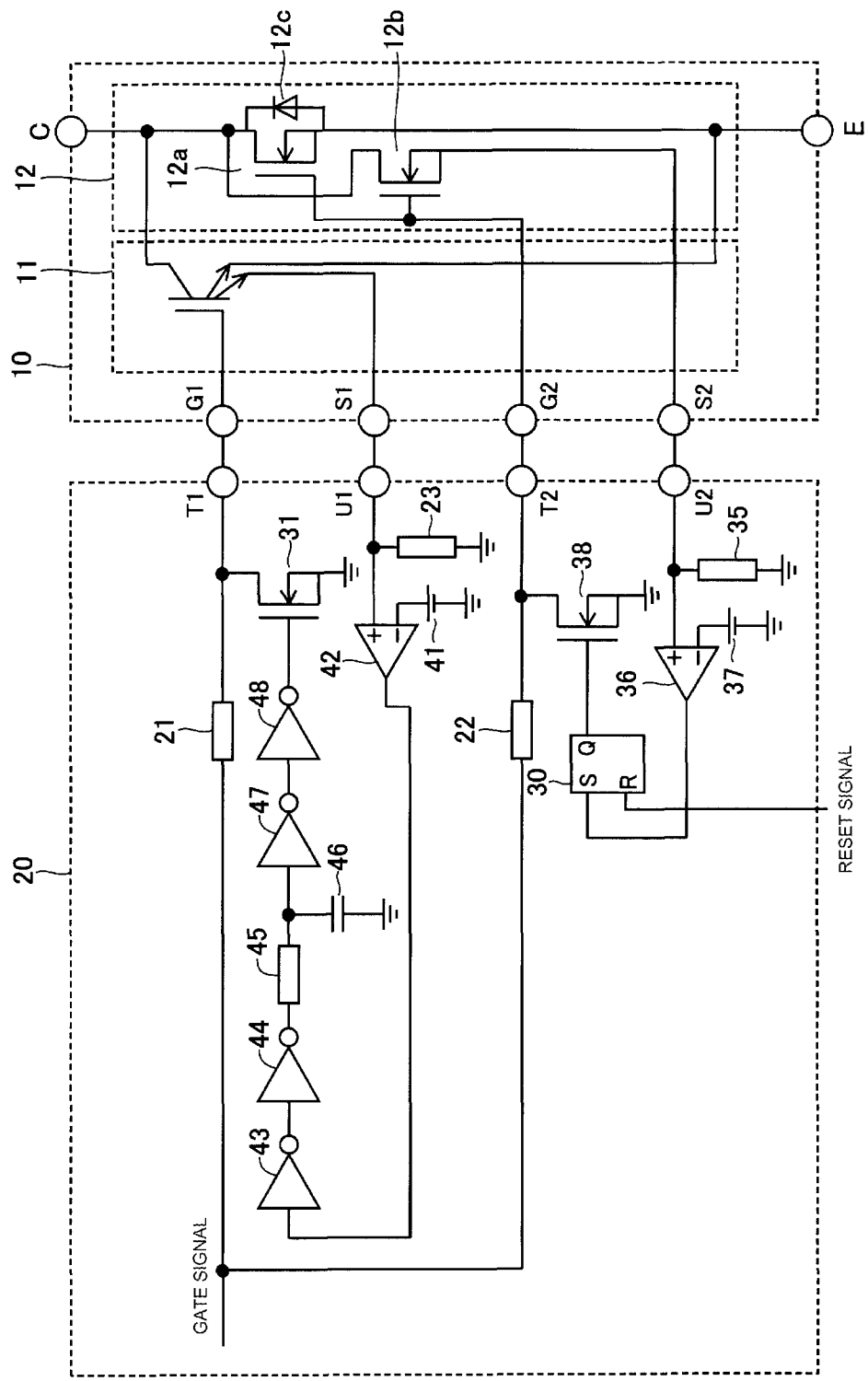
FIG. 3 is a circuit diagram of a semiconductor device according to a second embodiment of the present invention.
Figure 4:
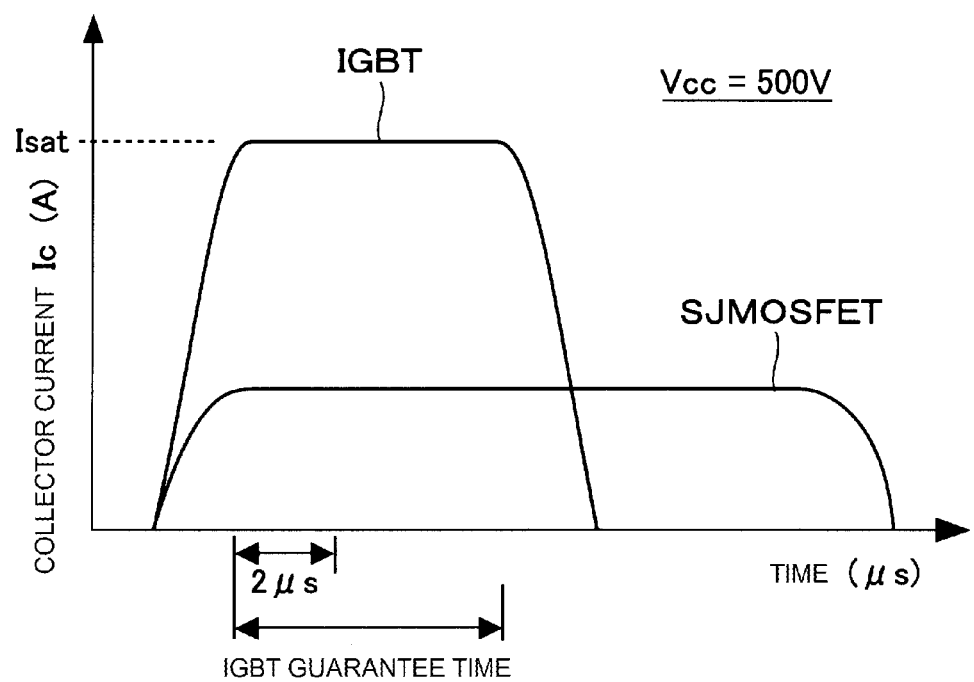
FIG. 4 is a chart of waveforms showing short-circuit tolerance of the semiconductor device according to the second embodiment of the present invention.

FIG. 3 is a circuit diagram of a semiconductor device according to a second embodiment of the present invention; and FIG. 4 is a chart of waveforms showing short-circuit tolerance of the semiconductor device according to the second embodiment of the present invention. The same symbols are given to the similar or equivalent components as those in FIG. 1.

In the semiconductor device according to the second embodiment of the invention, a control IC 20 comprises an overcurrent detecting circuit that comprises a resistor 23 for detecting overcurrent in the IGBT 11, and a comparator 42 for comparing a sensed voltage detected by the resistor 23 with a reference voltage provided by the reference voltage source 41. The output terminal of the comparator 42 is connected to one terminal of a resistor 45 through inverter circuits 43 and 44. The other terminal of the resistor 45 is connected to one terminal of a capacitor 46, and the other terminal of the capacitor 46 is connected to the ground. The other terminal of the resistor 45 is also connected to the gate of the transistor 31 through inverter circuits 47 and 48. The drain of the transistor 31 is connected to the resistor 21 and the terminal T1, and the source is connected to the ground. A delay circuit to delay the overcurrent detection signal for a predetermined period of time is constructed by the inverter circuits 43, 44 and inverter circuits 47, 48, which are waveform shaping circuits, and the resistor 45, and the capacitor 46.

In the control IC 20 of the second embodiment, an overcurrent detecting circuit of the SJMOSFET 12 and a forced OFF circuit to change the second control signal forcedly to an OFF signal are the same as those in the first embodiment.

In the semiconductor device having the construction described above, in a normal operation, the comparator 42 does not detect overcurrent of the IGBT 11 and delivers a voltage signal at a low level from the output terminal of the comparator 42. The voltage signal at a low level becomes a voltage signal at a low level after passing through two stages of inverter circuits 43 and 44. Consequently, the terminal voltage of the capacitor 46 is a voltage signal at a low level. Because the signal after passing through the inverter circuits 47 and 48 becomes a voltage signal at a low level, the transistor 31 is in an OFF state.

When the comparator 42 detects overcurrent of the IGBT 11 in an ON state of the power semiconductor element 10, the output terminal of the comparator 42 delivers a voltage signal at a high level. Because this voltage signal at a high level becomes a voltage signal at a high level after passing through the two stages of inverter circuits 43 and 44, the capacitor 46 is charged through the resistor 45. When the charged voltage of the capacitor 46 exceeds the threshold value of the inverter circuit 47 after a predetermined time period, the inverter circuit 47 delivers a voltage signal at a low level, and the inverter circuit 48 delivers a voltage signal at a high level. As a result, the transistor 31 turns ON to pull down the first control signal of the gate voltage given to the terminal T1 thereby turning OFF the IGBT 11.

At this time, the gate voltage, which is the second control signal, of the SJMOSFET 12 is unchanged and the SJMOSFET 12 remains in an ON state. A fraction of the drain current of the SJMOSFET 12 flows from the source of the current sense element 12b of the SJMOSFET 12 to the resistor 35 in the control IC 20. If the current through the resistor 35 increases to raise the sensed voltage and the sensed voltage exceeds the reference voltage of the reference voltage source 37, the comparator 36 delivers a voltage signal at a high level from the output terminal thereof. As a result, the RS flip-flop is set and delivers a voltage signal at a high level from the output terminal Q thereof to turn ON the transistor 38 thereby pulling down the gate voltage given to the terminal T2 to turn OFF the SJMOSFET 12.

The predetermined time period from the detection of overcurrent in the IGBT 11 by the comparator 42 to the turning OFF of the IGBT 11 is determined by the time constant that is calculated from the resistance value of the resistor 45 and the capacitance value of the capacitor 46. This predetermined time period is determined to be about 2 μs in the case the time period for guarantee a tolerance to breakdown is several microseconds. Here, the time period for guarantee a tolerance to breakdown is a short-circuit time in which a saturation collector current Isat can be kept running under application of a collector voltage of the IGBT 11 of 500 volts, for example, as shown in FIG. 4.

In this semiconductor device, the IGBT 11 is first turned OFF to reduce the burden on the IGBT 11, and the rest of the energy such as the energy stored in the load of an inductor is consumed in a long period in the SJMOSFET 12 which exhibits a lower saturation current than the IGBT 11 but allows longer short-circuit time. As a consequence, even if the IGBT 11 is subjected to a high voltage and heavy current as a result of short-circuit in a semiconductor device connected in series to the power semiconductor element 10, the IGBT 11 is turned OFF within the time period that guarantees the tolerance to breakdown, thereby avoiding breakdown of the IGBT 11. The IGBT 11 can be designed, turning the IGBT 11 OFF within the time period that guarantees the tolerance to breakdown, so that the IGBT 11 withstands higher current by increasing a channel density and raising the saturation current.

The time period of turning OFF the IGBT 11 and the time period of turning OFF the SJMOSFET 12 are determined by appropriately setting the time constants through proper selection of the resistance values of the resistors 21 and 22 corresponding to the gate capacitance values of the IGBT 11 and the SJMOSFET 12.

Third Embodiment

Figure 5:
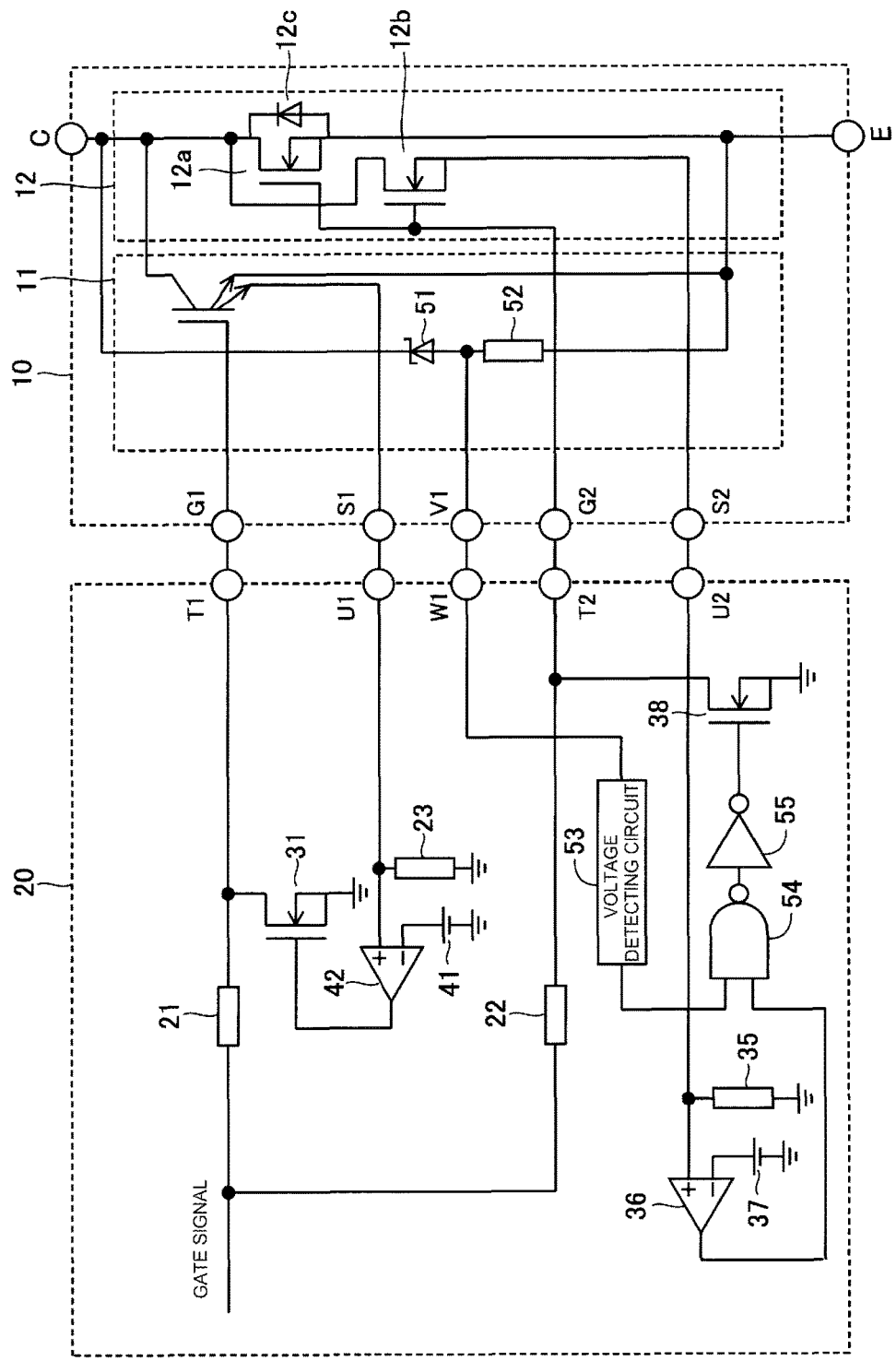
FIG. 5 is a circuit diagram of a semiconductor device according to a third embodiment of the present invention.
Figure 6:
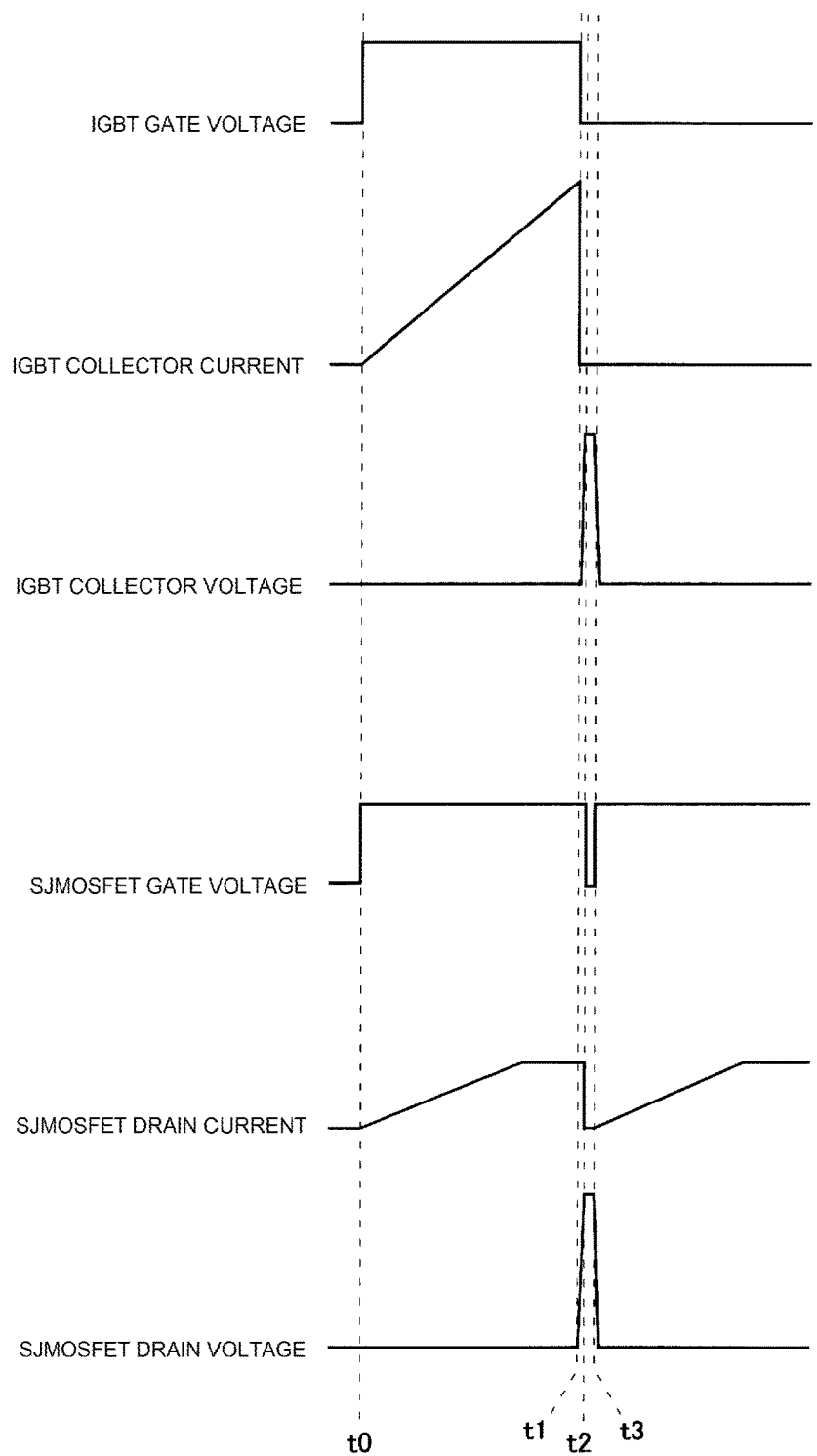
FIG. 6 is a timing chart showing waveforms of essential parts of the semiconductor device according to the third embodiment of the present invention.
Figure 7:
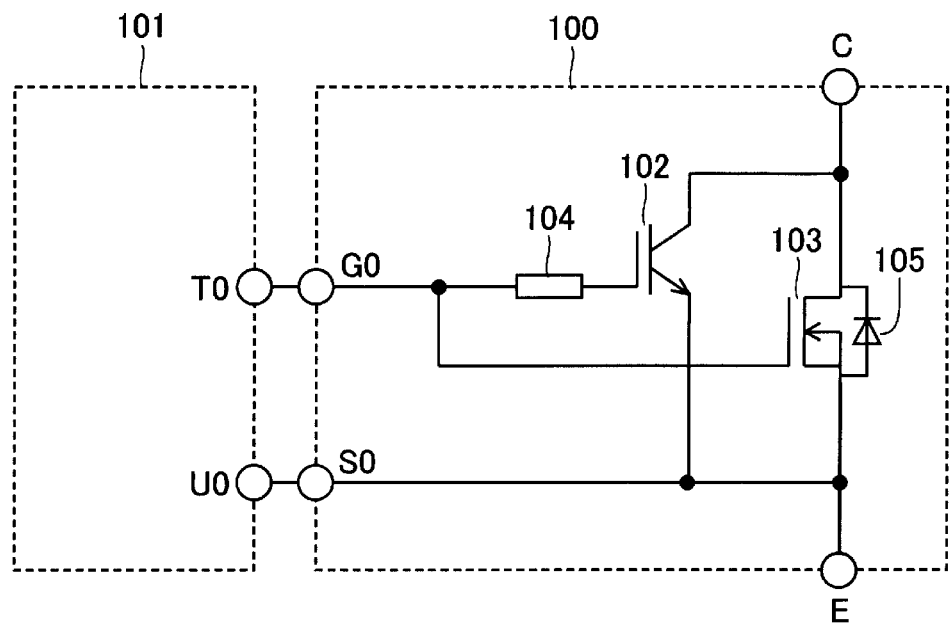
FIG. 7 is a circuit diagram showing an example of a conventional semiconductor device provided with an IGBT and a MOSFET.

FIG. 5 is a circuit diagram of a semiconductor device according to a third embodiment of the present invention; and FIG. 6 is a timing chart showing waveforms of essential parts of the semiconductor device according to the third embodiment of the present invention. The components in FIG. 5 similar or equivalent to those in FIG. 1 or FIG. 3 are given the same symbols.

In the semiconductor device according to the third embodiment, the control IC 20 is provided with a circuit for detecting overcurrent in the IGBT 11 and protecting the IGBT 11, and a circuit for detecting overvoltage and overcurrent in the SJMOSFET 12 and protecting the SJMOSFET 12.

The control IC 20 comprises a resistor 23 for detecting overcurrent in the IGBT 11, a comparator 42 for comparing the sensed voltage detected by the resistor 23 with a reference voltage of the reference voltage source 41, and a transistor 31 for pulling down the gate voltage given to the terminal T1. The control IC 20 with this construction turns OFF the IGBT 11 immediately upon detecting overcurrent in the IGBT 11.

This semiconductor device is provided with a series-connected circuit of a Zener diode 51 and a resistor 52 formed on the chip of the power semiconductor element 10. The cathode of the Zener diode 51 is connected to the terminal C of the power semiconductor element 10, and the anode of the Zener diode 51 is connected to one terminal of a resistor 52 and a terminal V1 of the power semiconductor element 10. The other terminal of the resistor 52 is connected to the terminal E of the power semiconductor element 10. If the voltage between the terminal E and the terminal C of the power semiconductor element 10 exceeds the Zener voltage of the Zener diode 51, overvoltage of the power semiconductor element 10 is detected utilizing abrupt current flow caused by an avalanche breakdown phenomenon.

The control IC 20 has a terminal W1 to detect overvoltage in the power semiconductor element 10. The terminal W1 is connected to the terminal V1 of the power semiconductor element 10. In the control IC 20, the terminal W1 is connected to a voltage detecting circuit 53 that monitors variation of the voltage drop across the resistor 52 developing due to abrupt current flow through the Zener diode 51.

The output terminal of this voltage detection circuit 53 is connected to one input terminal of a NAND circuit 54; the other input terminal of the NAND circuit 54 is connected to the output terminal of the comparator 36 that detects overcurrent of the SJMOSFET 12. The output terminal of the NAND circuit 54 is connected through an inverter circuit 55 to the gate of the transistor 38. The drain of the transistor 38 is connected to the terminal T2, and the source is connected to the ground.

In operation of the semiconductor device as described above, the IGBT 11 and the SJMOSFET 12 are first turned ON at the time t0 as shown in FIG. 6 when the gate voltage of the IGBT 11 and the gate voltage of the SJMOSFET 12 become a voltage signal at a high level.

Then at the time t1, when the comparator 42 of the control IC 20 detects overcurrent in the IGBT 11, the output signal of the comparator 42 immediately turns ON the transistor 31 to make the gate voltage for the IGBT 11 be a voltage signal at a low level. Therefore, the IGBT 11 is turned OFF and prevented from breakdown.

The turning OFF of the IGBT 11 causes fast rise of the collector voltage of the IGBT 11, which is detected at the time t2 by the Zener diode 51, the resistor 52, and the voltage detecting circuit 53. Because the comparator 36 detects overcurrent in the SJMOSFET 12, the two input terminals of the NAND circuit 54 receive voltage signals at a high level. As a result, the output terminal of the NAND circuit 54 delivers a voltage signal at a low value, which makes an output signal from the output terminal of the inverter circuit 55 be a voltage signal at a high level. Consequently, the transistor 38 is turned ON and pulls down the gate voltage given to the terminal T2, thereby turning OFF the SJMOSFET 12. Thus, when the SJMOSFET 12 is carrying a high current and subjected to a high voltage, the SJMOSFET 12 is turned OFF and prevented from breakdown. If only either one of high current or high voltage is subjected to on the SJMOSFET 12, the SJMOSFET 12 cannot be broken, so turning OFF operation of the SJMOSFET 12 is not conducted.

After turning OFF of the SJMOSFET 12, when the collector voltage of the IGBT 11 is decreased by suppressing the leap of the collector voltage at the time t3, the voltage detection circuit 53 ceases to detect overvoltage of the power semiconductor element 10 and delivers a voltage signal at a low level from the output terminal thereof. As a result, the output signal from the output terminal of the NAND circuit 54 becomes a high level and the output signal from the output terminal of the inverter circuit 55 becomes a voltage signal at a low level, turning the transistor 38 OFF. As a result, the gate voltage of the SJMOSFET 12 returns to a voltage signal at a high level to turn the SJMOSFET 12 ON again, and the energy remained after turning OFF of the IGBT 11 is consumed.

The present invention has been described thus far in reference to some preferred embodiment examples. The present invention, however, is not limited to those specific embodiment examples, but can be modified within the spirit and scope of the invention.

DESCRIPTION OF SYMBOLS

10: power semiconductor element
11: IGBT
12: SJMOSFET
20: control IC
21, 22, 23: resistor
24: operational amplifier
25: constant current source
26: capacitor
27: transistor
28: voltage source
29: latch circuit
30: RS flip-flop
31: transistor
35: resistor
36: comparator
37: reference voltage source
38: transistor
41: reference voltage source
42: comparator
43, 44: inverter circuit
45: resistor
46: capacitor
47, 48: inverter circuit
51: Zener diode
52: resistor
53: voltage detecting circuit
54: NAND circuit
55: inverter circuit

What is claimed is:

1. A semiconductor device comprising:
an insulated gate bipolar transistor (IGBT) having a collector, a first emitter, a second emitter and a gate;
a metal oxide semiconductor field effect transistor (MOSFET) formed on a chip on which the IGBT is formed, and exhibiting a withstand voltage lower than that of the IGBT, the MOSFET having a first element and a second element connected in parallel, each of the first and second elements having a drain, a source and a gate; and
a control integrated circuit (IC) delivering a first control signal to the gate of the IGBT, and a second control signal to the gate of the first element and the gate of the second element, the control IC comprising
an overcurrent detecting circuit for detecting overcurrent in the IGBT, and
a forcing OFF circuit for forcing the first control signal to be an OFF signal;
wherein
the collector of the IGBT is connected to the drains of the first and second elements,
the first emitter of the IGBT is connected to the source of the first element,
the second emitter of the IGBT is connected to the forcing OFF circuit, and
the forcing OFF circuit of the control IC forces the first control signal to be the OFF signal when the overcurrent detecting circuit detects overcurrent during a time period in which the IGBT and the MOSFET are in an ON state according to the first control signal and the second control signal.

2. The semiconductor device according to claim 1, wherein the forcing OFF circuit is a soft-OFF circuit that performs soft-OFF operation of the IGBT receiving the first control signal.

3. The semiconductor device according to claim 2, wherein the soft-OFF circuit comprises:
a latch circuit for holding a state of overcurrent detection when the overcurrent detection circuit detects overcurrent of the IGBT;
a ramp voltage generating circuit for delivering a ramp voltage with a continuously varying voltage value after the latch circuit has held the state of overcurrent detection; and a soft-OFF control circuit for changing a magnitude of the first control signal toward a turning OFF direction according to the ramp voltage.

4. The semiconductor device according to claim 2, wherein the control IC comprises
a second overcurrent detecting circuit for detecting overcurrent of the MOSFET, and
a second forcing OFF circuit for making the second control signal forcedly be the OFF signal, wherein
the second forcing OFF circuit makes the second control signal forcedly be the OFF signal when the second overcurrent detecting circuit detects overcurrent of the MOSFET after the forcing OFF circuit has made the first control signal forcedly be an OFF signal, and
the source of the second element is connected to the second forcing OFF circuit.

5. The semiconductor device according to claim 1, wherein the forcing OFF circuit comprises a delay circuit for making the first control signal be an OFF signal after passing a predetermined time period within a time period to guarantee a tolerance to breakdown of the IGBT.

6. The semiconductor device according to claim 5, wherein the control IC comprises a second overcurrent detecting circuit for detecting overcurrent of the MOSFET and a second forcing OFF circuit for making the second control signal forcedly be an OFF signal, and the second forcing OFF circuit makes the second control signal forcedly be an OFF signal when the second overcurrent detecting circuit detects overcurrent of the MOSFET after the forcing OFF circuit has made the first control signal forcedly be an OFF signal.

7. The semiconductor device according to claim 1, wherein the control IC comprises an overvoltage detecting circuit for detecting overvoltage of a voltage between a collector and an emitter of the IGBT, a second overcurrent detecting circuit for detecting overcurrent in the MOSFET, and a second forcing OFF circuit for making the second control signal forcedly be an OFF signal; and the second forcing OFF circuit makes the second control signal forcedly be an OFF signal when the overvoltage detecting circuit detects overvoltage and the second overcurrent detecting circuit detects overcurrent of the MOSFET after the forcing OFF circuit has made the first control signal forcedly be an OFF signal.

8. The semiconductor device according to claim 1, wherein the MOSFET is a super-junction MOSFET.

9. The semiconductor device according to claim 3, wherein the control IC comprises
a second overcurrent detecting circuit for detecting overcurrent of the MOSFET, and
a second forcing OFF circuit for making the second control signal forcedly be the OFF signal, wherein
the second forcing OFF circuit makes the second control signal forcedly be the OFF signal when the second overcurrent detecting circuit detects overcurrent of the MOSFET after the forcing OFF circuit has made the first control signal forcedly be an OFF signal, and
the source of the second element is connected to the second forcing OFF circuit.

10. An apparatus, comprising:
a power semiconductor element including
an insulated gate bipolar transistor (IGBT) having a collector, a first emitter, a second emitter and a gate, and
a metal oxide semiconductor field effect transistor (MOSFET) coupled in parallel with the IGBT, the MOSFET having a first element and a second element connected in parallel, each of the first and second elements having a drain, a source and a gate; and
a control device including
an IGBT overcurrent protection device configured to, in response to detecting an overcurrent of the IGBT, generate a first control signal to turn off the IGBT, and
a MOSFET overcurrent protection device configured to, in response to detecting an overcurrent of the MOSFET, generate a second control signal to turn off the MOSFET, wherein
the collector of the IGBT is connected to the drains of the first and second elements,
the first emitter of the IGBT is connected to the source of the first element,
the second emitter of the IGBT is connected to the IGBT overcurrent protection device, and
the source of the second element is connected to the MOSFET overcurrent protection device.

11. The apparatus of claim 10, wherein the first control signal is configured to cause a gate voltage of the IGBT to be reduced by a ramping voltage.

12. The apparatus of claim 10, wherein the first control signal is configured to be pulled down by turning on of a transistor coupled to a ground potential.

13. The apparatus of claim 12, wherein the IGBT overcurrent protection device includes a delay device configured to delay outputting of an overcurrent detection signal to the IGBT by a predetermined period of time.

14. The apparatus of claim 13, wherein the predetermined period of time corresponds to a tolerance to breakdown of the IGBT.

* * * * *